United States Patent Office 3,291,594
Patented Dec. 13, 1966

3,291,594
METHOD OF PRODUCING PHOSPHATIC FERTI-
LIZERS CONTAINING MAGNESIUM VALUES
John D. Nickerson, Lakeland, Fla., assignor to International Minerals & Chemical Corporation, a corporation of New York
No Drawing. Filed Oct. 9, 1963, Ser. No. 314,870
5 Claims. (Cl. 71—41)

This invention generally relates to the production of phosphate fertilizers. In a particular aspect it relates to a process for the production of phosphate fertilizers which contain at least fifty-five percent available phosphoric acid.

The commercial manufacture of fertilizers from phosphate rock, until recent years, has essentially contemplated only ordinary superphosphate and triple superphosphate. Ordinary superphosphate is manufactured by reacting phosphate rock with sulfuric acid. Triple superphosphate, sometimes referred to as "treble" or "double" superphosphate is the article of commerce used largely as a fertilizer. It is made by treating ground phosphate rock with phosphoric acid, or with a mixture of phosphoric acid and sulfuric acid. It has a $P_2O_5$ content of from about 45 to 50% $P_2O_5$ and is composed predominantly of monocalcium phosphate, $Ca(H_2PO_4)_2$, with small amounts of gypsum and fluorine compounds.

In recent years, consumers of fertilizers have urged the production of phosphate fertilizers of higher analysis than conventional triple superphosphate. The Tennessee Valley Authority sought to meet such demands by the development of a highly concentrated, so-called "super phosphoric acid," containing about seventy to seventy-five percent phosphorus pentoxide. Acidulation of phosphate rock with super phosphoric acid yields a fertilizer product containing an average of at least about fifty-four percent available phosphoric acid and characterized by acceptable proportions of water-soluble phosphorus pentoxide and citrate insoluble material. The production of super phosphoric acid is, however, beset by economic and other problems which have induced the fertilizer industry to seek an alternative route to the production of high analysis phosphate fertilizers.

Calcination of triple superphosphate has also been suggested as a method for obtaining a higher $P_2O_5$ product. While calcination of triple superphosphate does increase the total $P_2O_5$ content by driving off water, the increase in $P_2O_5$ is made at the sacrifice of available $P_2O_5$ content and ammoniation properties and at temperatures necessary to obtain a total $P_2O_5$ content of at least 54%, the water solubility and ammoniation characteristics are reduced to where the product is generally unsuitable for use in fertilizers.

It is, accordingly, an object of this invention to provide a new method for the production of high analysis phosphate fertilizers.

It is another object of this invention to provide a method for the production of high analysis fertilizers which contain water-soluble magnesium values.

Still another object of this invention is to provide a method for the production of phosphatic fertilizers of high analysis in which the unavailable phosphate content is maintained at a low level.

Still another object of this invention is to provide a method for the manufacture of a phosphatic fertilizer of unusually high analysis which displays remarkably low hydroscopicity on exposure to humid atmospheres.

These and other objects of this invention will become apparent from the following description.

Briefly, the method of this invention comprises preparing a finely comminuted starting material which contains at least 4% by weight of magnesium, calculated as magnesium oxide, the remainder of the feed being calcium carbonate or phosphate rock. The feed is reacted with phosphoric acid in amounts sufficient to provide a reaction product in which the mole ratio of MgO plus CaO to $P_2O_5$ is about 1. The reaction product is then calcined at a temperature in a range of 240 to 300° C. for a period of at least about 20 minutes to produce a phosphate fertilizer of outstanding properties.

As used in the specification and claims the term available phosphoric acid, commonly abbreviated to APA, is the sum of the water-soluble and the citrate-soluble phosphoric acid. The phosphoric acid content of fertilizers is expressed as weight percent phosphorus pentoxide ($P_2O_5$). The term "bone phosphate of line," commonly abbreviated to BPL, is also commonly used to express the phosphate content of fertilizers. This is the equivalent of $Ca_3(PO_4)_2$. The citrate-soluble phosphoric acid is that part of the total phosphoric acid in a fertilizer that is insoluble in water but soluble in a solution of citrate of ammonia according to the method adopted by the Association of Official Agricultural Chemists (A.O.A.C.).

The invention generically contemplates triple superphosphate made from dolomite or from any of the various phosphate materials such as phosphate rocks and apatite minerals. Reference is made to the treatise by Waggaman entitled, "Phosphoric Acid, Phosphates and Phosphatic Fertilizers," 2nd Ed. 1952, for a disclosure of a representative group of phosphate rocks and apatites and the production of triple superphosphate. Representative phosphate materials include Florida pebble phosphate, Tennessee phosphates, phosphate from the western states of the United States, Senegalese phosphates, Israeli phosphates and the like. Triple superphosphate derived from Florida pebble phosphate is preferred.

While it has been known that the APA content of phosphatic fertilizers can be increased by calcination at a temperature sufficient to remove moisture from the composition, the prior art has avoided calcination at temperatures in excess of 100° C. because treatment at higher temperatures, particularly temperatures above about 240° C., was known to result in a reversion of the available phosphate values to an unavailable, water-insoluble and citrate insoluble form. It has now been discovered, and this invention is in part based on this discovery, that when magnesium in the form of dolomite, magnesium carbonate, magnesium oxide, or magnesium chloride is admixed with a calcium-containing rock, such as calcium carbonate or phosphate rock, and the mixture acidulated with phosphoric acid to produce a phosphatic fertilizer, the product can be calcined to produce a fertilizer of outstanding available phosphoric acid content, having a $P_2O_5$ content of 55% or greater without reversion of substantial amounts of the $P_2O_5$ to an unavailable form.

In accordance with this invention the acidulated product is calcined at a temperature in the range of about 240 to 300° C., and preferably at a temperature in the range of about 260 to 300° C. Operation at higher temperatures results in reversion of phosphatic values to water-insoluble and citrate-insoluble forms. Calcination at temperatures lower than about 240° C. results in the production of a fertilizer product having a lower available phosphoric acid content than can be produced at higher temperatures. Calcination in the preferred temperature range of 260 to 300° C. additionally results in the production of a fertilizer product which is substantially non-hydroscopic.

Incorporation of at least 4% by weight of the solid mix of magnesium, calculated as magnesium oxide, is essential to the method of this invention. The absence of the stipulated amount of magnesium results in the production, upon calcination, of a product of reduced available $P_2O_5$ content which contains substantial quantities of unavailable $P_2O_5$. Further, the incorporation of magnesium within the stated ranges permits the preparation of a product suitable for subsequent treatment by ammoniation to produce a satisfactory ammonium phosphate fertilizer. When the product is calcined at a temperature in the range of 260 to 300° C., as is preferred, it further preferred that the magnesium be present in an amount in the range of 12% by weight to 20% by weight, calculated as magnesium oxide, based on the weight of the solid feed. In this way a product fertilizer of extremely low hydroscopicity is produced.

The magnesium values incorporated in the solid feed in accordance with this invention may be in the form of dolomite, which is a magnesium-calcium carbonate. Dolomite comprises a preferred solid feed for acidulation in accordance with this invention. The process of this invention may also be carried out by mixing with a phosphate rock, such as Florida pebble, a quantity of magnesium carbonate, magnesium oxide, magnesium chloride, or dolomite sufficient to provide a mixture containing at least 4% of magnesium, calculated as magnesium oxide, based on the total weight of the acidulation solids feed. It will be understood that the feed will be comminuted to a highly divided state in accordance with conventional phosphate fertilizer manufacture. Preferably, the feed will be comminuted to a state in which a major portion of the feed is smaller than 100 mesh. The acidulation can be carried out in a conventional manner using wet process phosphoric acid having a concentration in the range of 30% to 60% by weight $P_2O_5$, but preferably about 50 to 55% $P_2O_5$. The acidulation is carried out in a manner conventional to treble superphosphate manufacture. After a reaction time of a few minutes, during which the reacting materials are mixed, the materials reach a dry, friable state. The reaction product is then subjected to calcination, for example, in a rotary kiln, at a temperature range of 240° to 300° C. for a time of about 20 minutes to three hours.

*Example 1*

In accordance with a preferred practice of this invention 217 grams of wet process phosphoric acid having a $P_2O_5$ content of 50% by weight was mixed with 67.8 grams of dolomite. The dolomite analyzed 16.5% MgO, and 30.9% CaO. The acid and dolomite were mixed at a temperature of 60° C. The mixture set up in solid form after 1½ minutes, and reaching a dry, friable state after about 4 minutes. The ratios of dolomite to wet process acid were calculated to provide a mole ratio of CaO plus MgO to $P_2O_5$ of 0.96. A number of 24 gram samples of the acidulation product were placed in a muffle furnace and treated by calcination at different temperatures. In each case, the sample was raised to the stated temperatures over a period of ½ hour and maintained at that temperature for a period of ½ hour. The chemical and physical properties of the resulting calcined products are set forth in Table I.

TABLE I

| Temp., °C | Percent Total $P_2O_5$ | Percent C.I. $P_2O_5$ | Percent of Total $P_2O_5$, W.S. | Theoret. $NH_3$, lb./ unit APA | Percent by wt. Moisture pickup, 70% RH |
|---|---|---|---|---|---|
| Head | 49.6 | | 95 | | |
| 150 | 56.4 | 0.05 | 100 | 3.43 | 41 |
| 175 | 56.9 | 0.07 | 100 | 3.43 | 41 |
| 200 | 59.4 | 0.10 | 98.7 | 3.26 | 41 |
| 225 | 60.4 | 0.12 | 96.7 | 3.26 | 35 |
| 275 | 62.0 | 0.10 | 92.1 | 2.57 | 5 |
| 375 | 64.6 | 0.95 | 0.23 | 0.74 | 0 |

The data of Table I shows that a 60 APA or higher product is obtained at temperatures in excess of 225° C., and that high water solubility is maintained at temperatures up to 275° C. There is no substantial reversion to citrate insolubility even at temperatures far in excess of those contemplated by this invention. Further experiments were performed by calcining at 250° C. and 300° C. an acidulation product made using the same mole ratio of MgO plus CaO to $P_2O_5$, but employing a dolomite analyzing 18.2% MgO and 32.4% CaO. The results are set forth in Table II.

TABLE II

| Temp., ° C. | Percent Total $P_2O_5$ | Percent of Total $P_2O_5$, Water Soluble |
|---|---|---|
| Head | 47.6 | 91.7 |
| 250 | 61.3 | 97.7 |
| 300 | 63.5 | 88.9 |

*Example 2*

In accordance with this invention dolomite was mixed with phosphate rock (Florida pebble) and ground to −200 mesh. The ground feed was acidulated with wet process phosphoric acid in amounts sufficient to provide a calculated mole ratio of MgO plus CaO to $P_2O_5$ of 0.96, and the acidulated mixture was reacted at a temperature of 75° C. The mixes were cured for two days at 65° C. before calcination in a furnace maintained at 240 to 250° C. The analyses of the feed materials were as follows:

TABLE III

| Rock Analyses | 34.8% $P_2O_5$ | 49.7% CaO. |
|---|---|---|
| Acid Analyses | 56.3% $P_2O_5$ | 1.12% CaO. |
| Dolomite Analyses | 18.2% MgO | 32.4% CaO. |

The analyses of the uncalcined cured products, and of the calcined products, are set forth in Table IV.

TABLE IV

| Percent Dol. by wt. of rock | Cured product | | | | Calcined product | | | |
|---|---|---|---|---|---|---|---|---|
| | Percent total $P_2O_5$ | Percent C.I. $P_2O_5$ | Percent of total $P_2O_5$, W.S. | Percent FA | Percent total $P_2O_5$ | Percent C.I. $P_2O_5$ | Percent of total $P_2O_5$, W.S. | Percent wt. gain at 65% RH |
| 0 | 50.6 | 3.2 | 88.3 | 13.02 | 61.7 | 4.75 | 73.7 | 45 |
| 10 | 50.8 | 2.5 | 88.7 | 12.04 | 61.9 | 4.50 | 80.2 | 29 |
| 30 | 50.0 | 2.4 | 89.2 | 12.17 | 61.2 | 3.65 | 85.8 | 46 |
| 100 | 49.4 | 1.7 | 93.0 | 15.36 | 59.8 | 2.50 | 95.3 | |

These data indicate the improvement in the quantities of water-soluble $P_2O_5$ in the products to be expected by dolomite addition to the phosphate rock under the described operating conditions.

*Example 3*

The procedure of Example 2 was repeated with the exception that the mole ratio of magnesium oxide plus calcium oxide to $P_2O_5$ was maintained at 0.98, and in Run 3 basic magnesium carbonate was used instead of dolomite, the basic magnesium carbonate being incorporated in an amount equivalent to the magnesium provided by the 30% dolomite addition of Run 2. The results are set forth in Table V.

TABLE V

| Percent Dolomite by wt. of rock | Cured product | | | Calcined product | | | | | |
|---|---|---|---|---|---|---|---|---|---|
| | Percent Total $P_2O_5$ | Percent C.I. $P_2O_5$ | Theoret. $NH_3$, lb. $NH_3$/unit APA | Percent Total $P_2O_5$ | Percent C.I. $P_2O_5$ | Percent of Total $P_2O_5$, W.S. | Theor. $NH_3$, lb. $NH_3$/unit APA | Percent wt. Gain 24 hrs., 37.1% RH | Percent wt. Gain 24 hrs., 70.1% RH |
| 0 | 50.6 | 2.7 | 4.09 | 61.6 | 3.55 | 59.4 | 1.89 | 4.0 | 27.0 |
| 30 | 49.7 | 3.0 | 4.18 | 61.4 | 4.72 | 77.3 | 2.39 | 2.5 | 19.5 |
| Basic $MgCO_3$ | 49.6 | 4.5 | 4.39 | 60.6 | 4.57 | 86.5 | 3.17 | 5.5 | 29.5 |

The data show the water solubility improvement which is obtainable using a mixture of dolomite and phosphate rock, and that the same results can be obtained when the magnesium values are supplied as basic magnesium carbonate. Also, the improvement in ammoniation characteristics and hydroscopicity levels are noteworthy.

*Example 4*

The reactions of Example 2 were again repeated at a MgO plus CaO to $P_2O_5$ mole ratio of 0.96. In Run 1 only rock and acid were used. In Run 2 phosphate rock, acid and calcium carbonate were used. In Run 3 phosphate rock, acid and dolomite were used. In Run 4 phosphate rock, acid and a quantity of magnesium chloride equivalent to the magnesium content of the dolomite of Run 3 were used. The results are set forth in Table VI. In each of these runs the calcination was carried out at a temperature of 260 to 265° C. for three hours.

TABLE VI

| Mixture | Percent Total $P_2O_5$ | Percent C.I. $P_2O_5$ | Percent of Total $P_2O_5$, W.S. |
|---|---|---|---|
| Rock+acid | 59.4 | 4.80 | 57.4 |
| Rock+acid+31% $CaCO_3$ | 60.3 | 3.12 | 54.2 |
| Rock+acid+30% dolomite | 60.1 | 3.95 | 68.2 |
| Rock+acid+$MgCl_2 \cdot 6H_2O$ | 60.8 | 3.57 | 69.4 |

The results of this example establish the effectiveness of the magnesium additive whether incorporated in the form of magnesium chloride, or in the form of dolomite.

While the invention has been described in detail with respect to the several preferred embodiments thereof, and has been illustrated with reference to specific examples, it will be understood that within the scope of the appended claims the invention can be practiced otherwise than as specifically described.

The embodiments of the invention in which an exclusive property or privilege is claimed are defined as follows:

1. A method of making phosphoric fertilizer comprising preparing a finely comminuted starting material consisting essentially of materials of the group consisting of dolomite, admixtures of dolomite and phosphate rock, admixtures of magnesium chloride and phosphate rock, and admixtures of magnesium carbonate and phosphate rock, said starting material being characterized by magnesium content (calculated as magnesium oxide) of about 4.0 to about 20.0% by weight of said material, acidulating said starting material with phosphoric acid in an amount sufficient to provide in the acidulation product having a CaO plus MgO to $P_2O_5$ mole ratio of about 1, and calcining the acidulation product at a temperature in the range of 260 to 300° C. for a period of at least 20 minutes to recover a fertilizer containing $P_2O_5$ values in water-soluble form.

2. The method in accordance with claim 1 in which the magnesium content of said material (calculated as magnesium oxide) is in the range of 14 to 20%.

3. The method in accordance with claim 1 in which said material is a mixture of dolomite and phosphate rock.

4. The method in accordance with claim 2 in which the time of calcination is within the range of 20 minutes to 3 hours.

5. The method in accordance with claim 4 in which said material is dolomite.

References Cited by the Examiner
UNITED STATES PATENTS

| | | | |
|---|---|---|---|
| 305,249 | 9/1884 | Stillman | 71—47 X |
| 1,869,879 | 8/1932 | Balz | 71—41 |
| 1,953,419 | 4/1934 | MacIntire | 71—53 X |
| 2,021,671 | 11/1935 | Skinner | 71—41 |
| 2,137,674 | 11/1938 | MacIntire | 71—41 |
| 2,193,842 | 3/1940 | Rex | 71—53 |
| 2,977,213 | 3/1961 | Maluta et al. | 71—41 |

DONALL H. SYLVESTER, *Primary Examiner.*

ANTHONY SCIAMANNA, *Examiner.*

T. D. KILEY, *Assistant Examiner.*